United States Patent
Lippi et al.

(10) Patent No.: US 12,539,752 B2
(45) Date of Patent: Feb. 3, 2026

(54) MOTORIZED MODULE FOR GOODS TRANSPORT AND CONTROL METHOD FOR SAID MOTORIZED MODULE

(71) Applicant: COMETTO S.P.A., Borgo San Dalmazzo (IT)

(72) Inventors: Fabrizio Lippi, Borgo San Dalmazzo (IT); Alexander Fickers, Borgo San Dalmazzo (IT); Francesco Froni, Borgo San Dalmazzo (IT); Willian D'Agostino, Borgo San Dalmazzo (IT); Alessandro Martini, Borgo San Dalmazzo (IT)

(73) Assignee: COMETTO S.P.A. (IT)

( * ) Notice: Subject to any disclaimer, the term of this patent is extended or adjusted under 35 U.S.C. 154(b) by 289 days.

(21) Appl. No.: 18/562,971

(22) PCT Filed: May 24, 2022

(86) PCT No.: PCT/IB2022/054841
§ 371 (c)(1),
(2) Date: Nov. 21, 2023

(87) PCT Pub. No.: WO2022/249054
PCT Pub. Date: Dec. 1, 2022

(65) Prior Publication Data
US 2024/0227538 A1 Jul. 11, 2024

(30) Foreign Application Priority Data

May 26, 2021 (IT) .................... 102021000013739

(51) Int. Cl.
*B60K 7/00* (2006.01)
*B60K 17/02* (2006.01)
(Continued)

(52) U.S. Cl.
CPC ............ *B60K 7/0015* (2013.01); *B60K 17/02* (2013.01); *B60K 17/043* (2013.01);
(Continued)

(58) Field of Classification Search
CPC .... B60K 7/0015; B60K 17/02; B60K 17/043; B60K 17/105; B60K 17/356; B60K 17/36;
(Continued)

(56) References Cited

U.S. PATENT DOCUMENTS 5,848,664 A 12/1998 Kaspar
2007/0151223 A1* 7/2007 Piva .................. A01D 45/26
56/327.1

(Continued)

FOREIGN PATENT DOCUMENTS

CN 107842590 A * 3/2018 .............. F16H 48/11
DE 102014007979 A1 12/2015
(Continued)

OTHER PUBLICATIONS

International Search Report issued in PCT/IB2022/054841.

*Primary Examiner* — Joseph J Dallo
(74) *Attorney, Agent, or Firm* — The Belles Group, P.C.

(57) ABSTRACT

A motorized module for goods transport has a loading platform; at least a first and at least a second axle each provided with at least one respective rolling body on the ground, a respective mechanical speed reducer, a respective releasable angular connection joint interposed between a respective hydraulic motor for driving the axle and the respective rolling body, and an electronic unit for controlling the hydraulic motors and the angular connection joints as a function of the advancement speed of the module and being activated in succession as the advancement speed of the module itself varies.

14 Claims, 9 Drawing Sheets

(51) Int. Cl.
*B60K 17/04* (2006.01)
*B60K 17/10* (2006.01)
*B60K 17/356* (2006.01)
*B60K 17/36* (2006.01)

(52) U.S. Cl.
CPC .......... *B60K 17/105* (2013.01); *B60K 17/356* (2013.01); *B60K 17/36* (2013.01); *B60Y 2200/1422* (2013.01); *B60Y 2200/148* (2013.01)

(58) Field of Classification Search
CPC .......... B60K 2023/0866; B60K 17/358; B60K 23/0808; B60K 2007/0038; B60K 2007/0061; B60Y 2200/1422; B60Y 2200/148; B60Y 2200/44
See application file for complete search history.

(56) References Cited

U.S. PATENT DOCUMENTS

| | | | | |
|---|---|---|---|---|
| 2014/0245978 | A1* | 9/2014 | Tadokoro | F01L 1/344 |
| | | | | 123/90.11 |
| 2018/0003280 | A1* | 1/2018 | Dziuba | F16H 47/04 |
| 2021/0009198 | A1* | 1/2021 | Suzuki | B62D 5/006 |
| 2021/0009202 | A1* | 1/2021 | Suzuki | B62D 6/002 |
| 2021/0016827 | A1* | 1/2021 | Suzuki | B62D 5/0481 |
| 2021/0213779 | A1 | 7/2021 | Sollik et al. | |

FOREIGN PATENT DOCUMENTS

| | | | | |
|---|---|---|---|---|
| DE | 102016203577 | A1 | 9/2017 | |
| WO | WO-2020037989 | A1 * | 2/2020 | ............ B25J 9/1692 |

* cited by examiner

MOTORIZED MODULE FOR GOODS TRANSPORT AND CONTROL METHOD FOR SAID MOTORIZED MODULE

CROSS-REFERENCE TO RELATED APPLICATIONS

This patent application is a U.S. national stage application under 35 U.S.C. § 371 of PCT Application No. PCT/IB2022/054841, filed on May 24, 2022, which claims priority to Italian Patent Application No. 102021000013739 filed on May 26, 2021, t. The entire disclosures of the aforementioned priority applications are incorporated herein by reference in their entireties.

TECHNICAL FIELD OF THE INVENTION

The present invention relates to a motorized module for the transport of goods.

For the transport of heavy loads variable from several tens up to thousands of tons, it is known to use motorized transport vehicles comprising one or more modules having respective loading platforms and a plurality of tyred axles.

In particular, each module may be of the self-propelled type and therefore capable of operating autonomously, for example, within construction sites or work areas, or it may be connected t towing tractor when the route involves travelling along stretches of highway and therefore at relatively high speeds or along common roads where winding stretches and/or stretches with steep slopes may occur where the speed is much lower but high and variable driving actions are required.

STATE OF THE ART

For this purpose, goods transport modules are known to date having a loading platform and a plurality of axles and wherein the wheels of at least some of the same axles are driven by a closed circuit hydraulic system.

An example of a closed circuit hydraulic system of the type mentioned above is illustrated in Figure A1.

The system comprises a variable displacement hydraulic pump P driven by a heat engine or by an electric motor K1 and a plurality of hydraulic motors M1, M2, . . . Mn constructively equal to each other and also with variable displacement.

The hydraulic motors are connected to a delivery branch A and to a return branch B and have respective output shafts each coupled to one or more respective wheels R.

In order to increase the torque transmitted to the wheels R, a mechanical reducer, for example of an epicyclic type, is provided between each hydraulic motor and the respective wheel.

As is known, mechanical reducers, on the one hand, enable the torque transmitted to the wheels to be increased but, on the other hand, inevitably progressively reduce the rotation speed of the wheels themselves and therefore the advancement speed of the module.

For these reasons, the known modules are valued for the transport of heavy loads at low speeds but are unsatisfactory when moving at higher speeds, enabled by the low load being transported or by the conditions of the route being travelled, resulting in an increase in transfer times and, consequently, the overall transport costs.

In order to solve said problem it is known, to date, to use reducers with discretely variable reduction ratio, for example, by excluding a reduction stage of the epicyclic reducer. This enables the advancement speed of the vehicle to be slightly increased, but still within a very contained range, but entails a higher cost of the reducer compared to the cost of a traditional reducer with a fixed transmission ratio.

Attempts to improve the above solution have been made by using reducers with a variable reduction ratio deriving from reducers used in the automotive field.

Although theoretically said reducers may solve the problem of low towing or transfer speed outlined above, they have not found an actual application due to their significant axial overall dimension which has prevented them from even being mounted on compact axles such as those of the latest generation.

An alternative technical solution is to increase the number of motorized axles, i.e., the number of wheels. Said solution enables, for the same towing force of the unit, to reduce the reduction ratio of the reducers and therefore to consequently increase the transfer speed at no load or low load, but proves impractical as the increase in the number of axles exponentially increases the cost of the unit and, often, also its length for the same transportable load.

Finally, transport units are known, in which the problem of low advancement speed is solved by disconnecting all the mechanical reducers from the respective hydraulic motors. In the disconnected condition, the module behaves in the same way as ordinary towed an trailer by the tractor, which autonomously tows unit at the allowed speed without receiving any traction contribution from the module itself.

For this reason, the tractor must, from time to time, be selected according to both the maximum pull foreseeable which depends on the mass to be towed but also on the type of route to be taken, since it must autonomously compensate for sudden, unforeseen, and frequent increases in towing force when traveling at a speed comprised between the speed at which the reducers are disconnected and the maximum cruising speed. This often results in the use of large size tractors with corresponding increased costs and only partial use of the towing power.

SUBJECT AND SUMMARY OF THE INVENTION

An object of the present invention is to produce a motorized module for goods transport, which allows the above problems to be solved in a simple and economical manner.

It is a particular object of the present invention to produce a motorized module for goods transport, which is settable as both the load conditions and the conditions of use such as, for example, the state of the ground vary without substantial wheel slippage or reductions in towing force.

A further object of the present invention is to produce a motorized module capable of moving the load even at high speeds by operating both autonomously and by variably integrating the traction action exerted by other independent tractors.

According to the present invention, a motorized module for goods transport is obtained comprising a loading platform; at least a first and at least a second axle each provided with at least one respective rolling body on the ground; and actuation means for actuating said rolling bodies; said actuation means comprising a closed circuit hydraulic system, in turn comprising a closed hydraulic circuit, at least one motorized pump arranged along the closed circuit to send a pressurized the operating fluid to a delivery branch and receive pressurized fluid from a return branch of the closed circuit, at least a first and at least a second variable displacement hydraulic motor both hydraulically connected to the delivery branch and to the return branch to operate the rolling body of the first axle and the rolling body of said second axle, respectively; said actuation means further comprising a first mechanical reducer interposed between the first hydraulic motor and the respective rolling body, a second mechanical reducer interposed between said second hydraulic motor and the respective rolling body, first and second releasable angular connection means interposed between said first hydraulic motor and the respective said rolling body and, between the second hydraulic motor and the respective rolling body, respectively, and an electronic command and control unit comprising means for acquiring the advancement speed of the module, means for controlling said hydraulic motors and means for activating/deactivating said first and second releasable angular connection means; said command and control unit being configured to vary the displacement of said first and second hydraulic motors and to control said first and second releasable angular connection means as a function of the advancement speed of the unit; characterized in that said first mechanical reducer has a reduction ratio less than the reduction ratio of said second mechanical reducer and in that said command and control unit is configured to activate said first angular connection means and subsequently said second angular connection means as said advancement speed of said module decreases.

Lastly, the present invention relates to a method for controlling a motorized module for goods transport.

According to the present invention, a method is provided for controlling a motorized module for goods transport, as claimed in claim 11.

BRIEF DESCRIPTION OF THE DRAWINGS

The invention will now be described with reference to the attached figures, which illustrate a non-limiting embodiment thereof, wherein.

Figure A1 illustrates, schematically and substantially in a block diagram, a motorized module produced according to the known technique.

DETAILED DESCRIPTION OF PREFERRED EMBODIMENTS OF THE INVENTION

Figure 1:
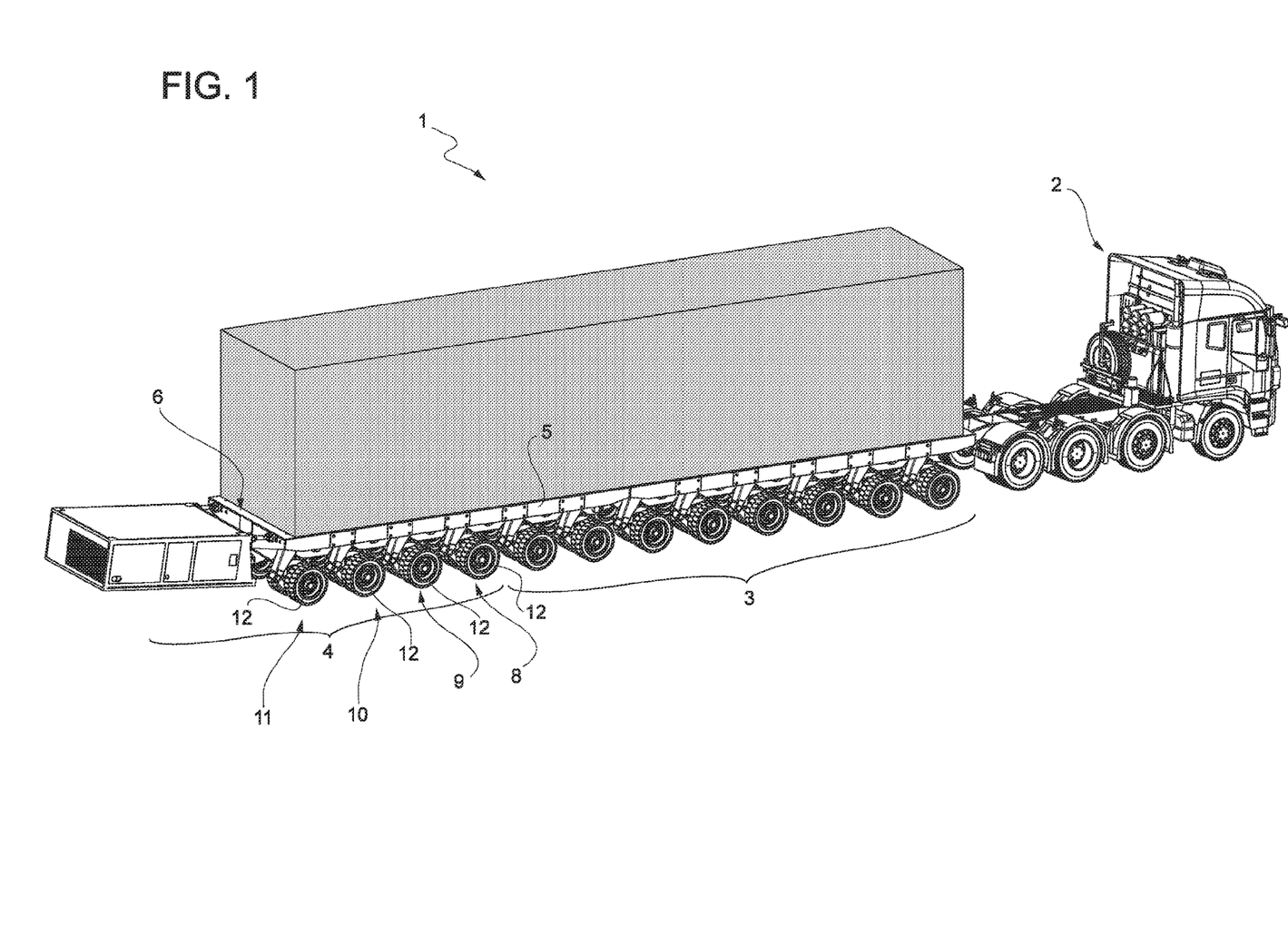
FIG. 1 illustrates, schematically and substantially in a block diagram, a vehicle for goods transport provided with a preferred embodiment of a motorized module for goods transport produced according to the dictates of the present invention.

In FIG. 1, 1 denotes, as a whole, a vehicle for the transport of goods.

The vehicle 1 comprises a front towing tractor 2, an intermediate trailer 3 having tyred axles with idle wheels coupled to the tractor 2 in a per se known manner and a rear motorized module 4.

The module 4 is in fact an autonomous self-propelled unit, which, in the example described is firmly connected to the trailer 3.

Alternatively, the module 4 is coupled to the trailer 3 in a detachable manner or isolated from the trailer 3 and from the tractor 2 in order to define a vehicle that operates autonomously to transport a respective load.

The module 4 cooperates synergistically with the tractor 2, during movement of the load, when firmly connected to trailer 3.

Figure 2:
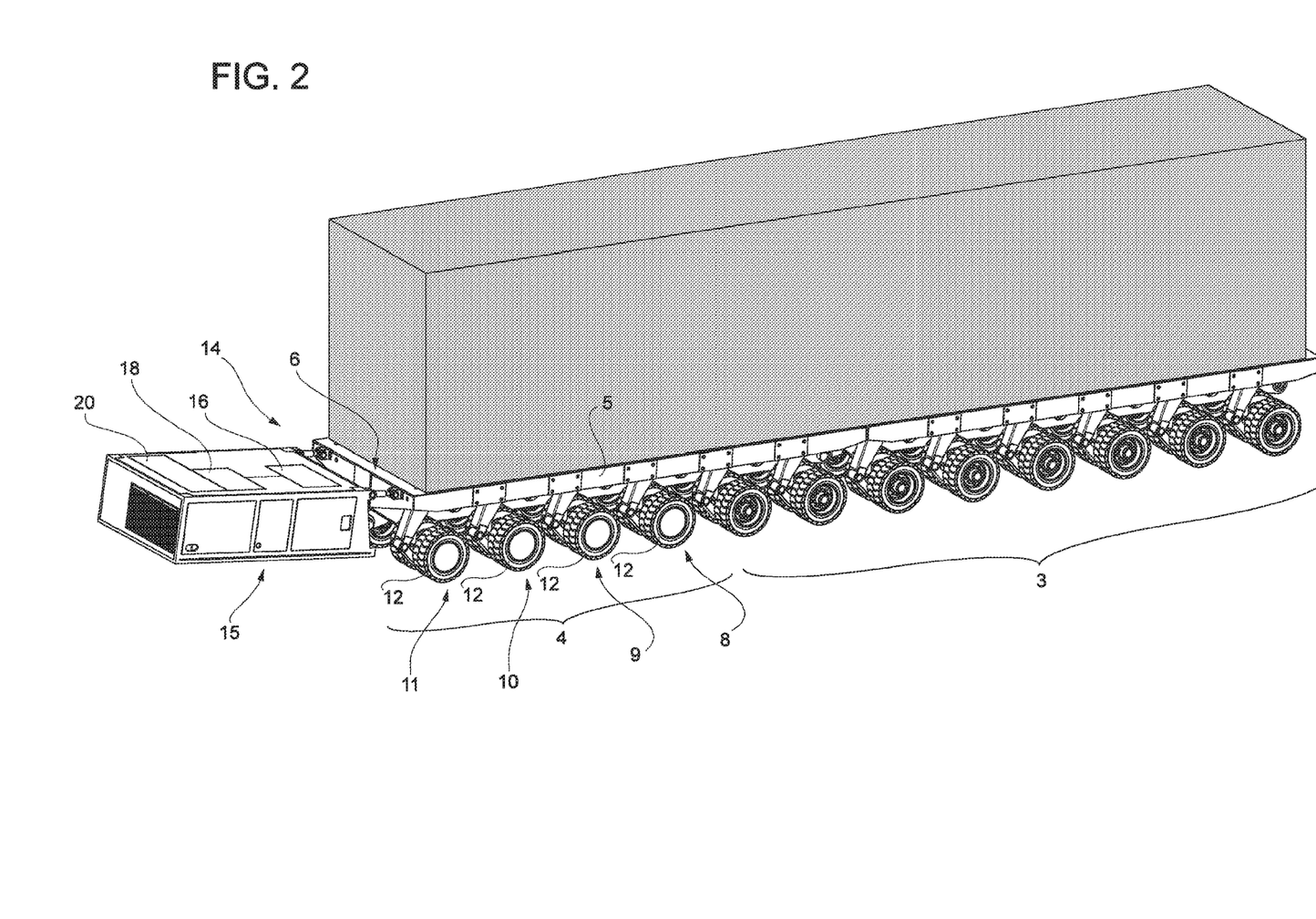
FIG. 2 illustrates, schematically and substantially in a block diagram, a different goods transport vehicle provided with a preferred embodiment of the goods transport module produced according to the dictates of the present invention.

Regardless of whether the module 4 operates autonomously or synergistically with the tractor 2, the module 4 comprises a frame 5 defining a loading platform 6 and, four motorized axles designated by 8, 9, 10 and 11 (FIGS. 1-3) each comprising, in the example described, a respective pair of wheels 12.

Figure 3:
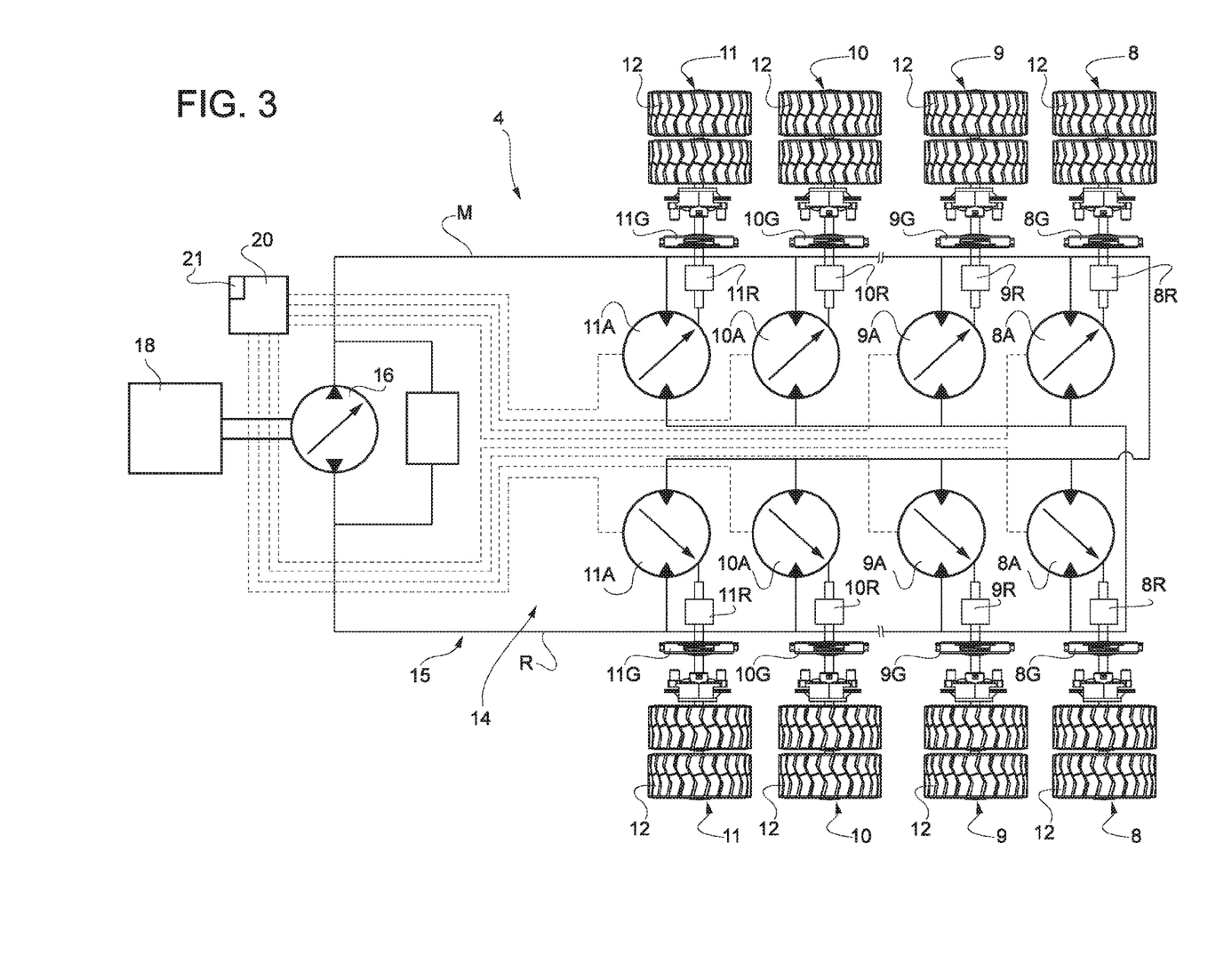
FIG. 3 illustrates, schematically and in a block diagram, the transport module of FIGS. 1 and 2.
Figure 4:
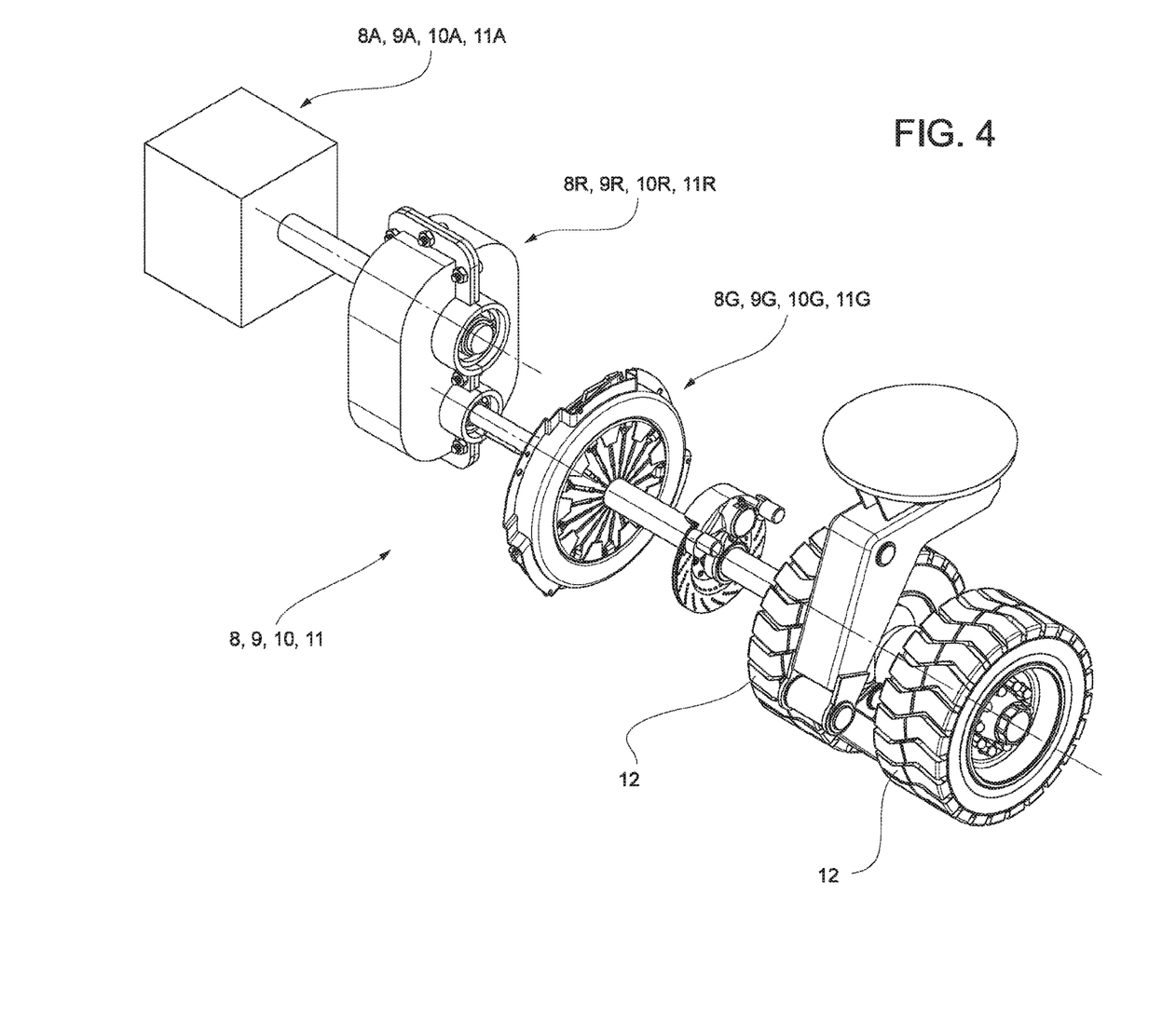
FIG. 4 illustrates, schematically and on an enlarged scale, a detail of FIG. 3.

With reference to FIG. 3, the module 4 comprises a drive unit 14 for the wheels 12 and, in turn, comprising, for each axle 8, 9, 10 and 11, a respective pair of variable displacement hydraulic motors, designated by 8A, 9A, 10A and 11A each driving a respective wheel 12.

According to the invention, the hydraulic motors 8A, 9A, 10A and 11A are equal to each other, meaning that, they have the same maximum displacement C.

Alternatively, according to a different embodiment, the hydraulic motor 11A has a maximum displacement C1 greater than the displacement C.

The hydraulic motors 8A, 9A, 10A and 11A form part of a closed hydraulic circuit 15 which further comprises a variable displacement pump 16 driven by its electric motor or an internal combustion engine, designated by 18.

According to a variant not illustrated, the hydraulic system 15 comprises two or more pumps 16 driven by respective motors 18.

The pump 16 and the hydraulic motors 8A, 9A, 10A and 11A are connected, in a per se known manner, to a delivery branch M and to a return branch R of the circuit 15, as can be seen in FIG. 3, and are controlled by an electronic command and control unit 20 of the module 4, known per se and illustrated schematically.

The command and control unit 20 comprises a detector 21 for detecting the advancement speed of the module 4 and commands and controls the pump 16, the hydraulic motors 8A, 9A, 10A and 11A and the motor 18 for actuating the pump 16 itself as a function of a speed signal received from the detector 21.

Again with reference to FIG. 3, the drive unit 14 further comprises for each wheel 12 of the axles 8-11, a respective mechanical speed reducer designated respectively by 8R, 9R, 10R and 11R, conveniently, but not necessarily, with a fixed reduction ratio arranged between the respective hydraulic motor 8A, 9A, 10A and 11A and the respective wheel 12.

Conveniently, the reducers 8R, 9R and 10R all have the same reduction ratio R whereas the reducer 11A has a reduction ratio R1 that is less than the reduction ratio R of the reducers 8R, 9R, 10R.

In the example described, the reduction ratio R is equal to 1/42, whereas the reduction ratio R1 is equal to 1/12. Obviously, the reduction ratios may vary according to the specific application.

According to a variation, at least one of the reducers 8R, 9R, 10R has its own reduction ratio which is different from the reduction ratios of the other reducers 8R, 9R, 10R.

Lastly, the drive unit 14 comprises, for each wheel 12, a respective releasable angular connection joint, designated by 8G, 9G, 10G and 11G, respectively. The angular joints 8G, 9G, 10G and 11G are each interposed between the respective mechanical reducer 8R, 9R, 10R and 11R and the respective wheel 12 and are all controlled by the unit 20.

The unit 20 is configured to control the angular joints 8G, 9G, 10G and 11G independently of each other and to move each of them between a motion transmission condition and a release condition, in which the joints make the respective wheels 12 idle according to the advancement speed of the module 4.

Figure 5:
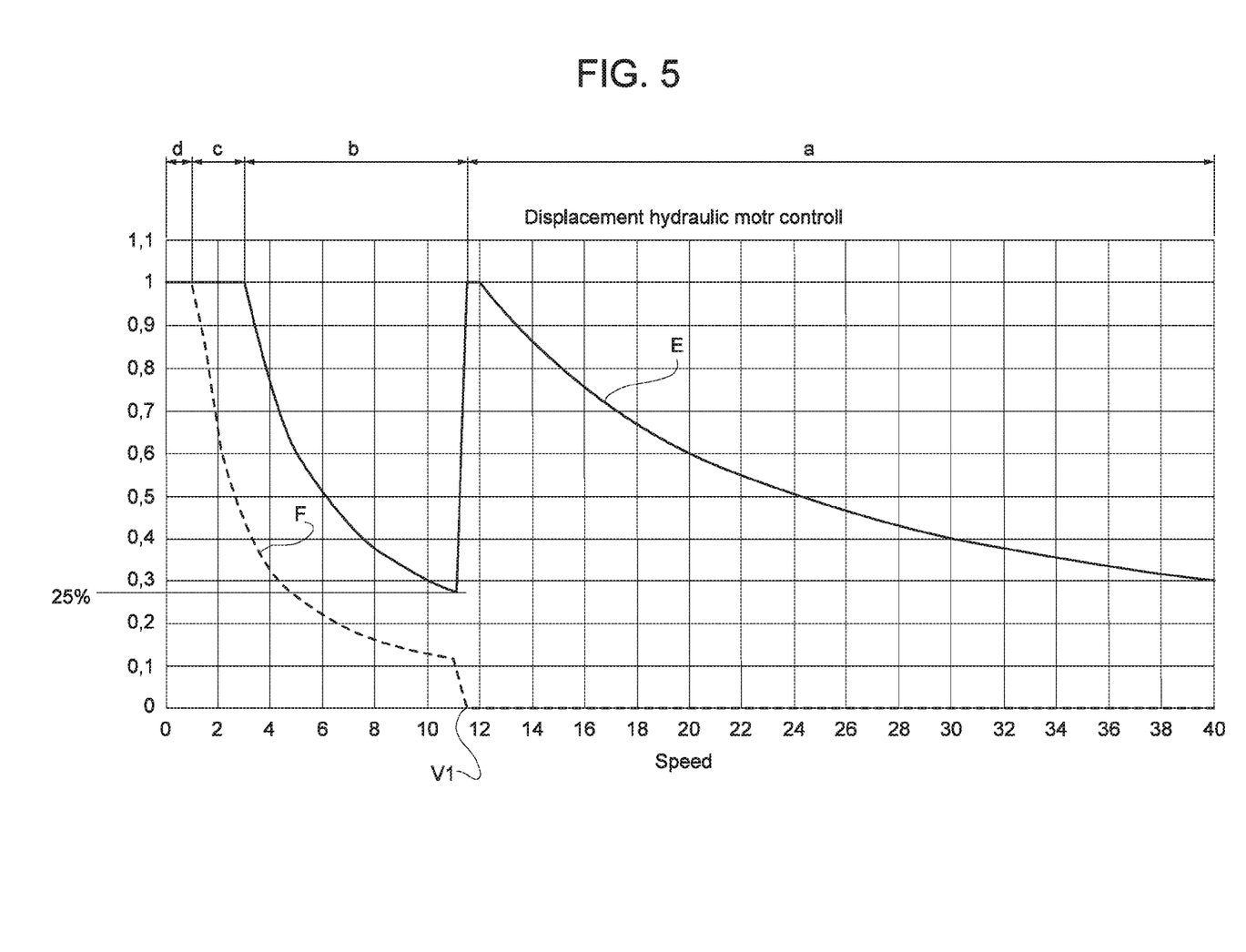
FIG. 5 is a graph that illustrates a control mode of the motorized module of FIG. 3 as the advancement speed of the module itself varies.

Control of the variation of the displacement of the hydraulic motors 8A, 9A, 10A and 11A and the angular joints 8G, 9G, 10G and 11G, as the advancement speed of the module 4 varies, is represented by the graphs of FIG. 5, where the line E illustrates the variation of the displacements of the hydraulic motors 11A, while the line F illustrates the variation of the displacements of the hydraulic motors 8A, 9a, 10A.

The graphs of FIG. 5 can be divided into four areas, in particular:
- an area "d", in which all the hydraulic motors 8A, 9A, 10A, and 11A work in a maximum displacement condition;
- an area "c", in which the hydraulic motors 11A always work in a maximum displacement condition, whereas the displacement of the hydraulic motors 8A, 9A, 10A is progressively adjusted and reduced until it is annulled at a speed value V1 corresponding to an operating limit speed of the mechanical reducers 8R, 9R and 10R.

Here and in the following, with the term "operating limit speed" we mean the maximum speed rate allowed by the reducer, which results from the type of construction, the cooling device, the surface treatment of the teeth, type of bearing used, etc. In other words, the operating limit speed is the maximum rotation rate, beyond which an unexpected breakdown of the reducer could occur.

- an area "b" in which the displacements of all the hydraulic motors 8A, 9A, 10A and 11A are adjusted. Conveniently, the displacement of each hydraulic motor 8A, 9A, 10A and 11A is adjusted by considering the displacement of the hydraulic motors and so as to have the same torque on each axle 8, 9, 10 and 11 at the same hydraulic pressure in the delivery and return branches.
- an area "a" in which all the angular joints 8G, 9G, 10G are released so that the respective wheels 12 are idle wheels, and wherein only the hydraulic motor 11A works in adjustment.

Figure 6:
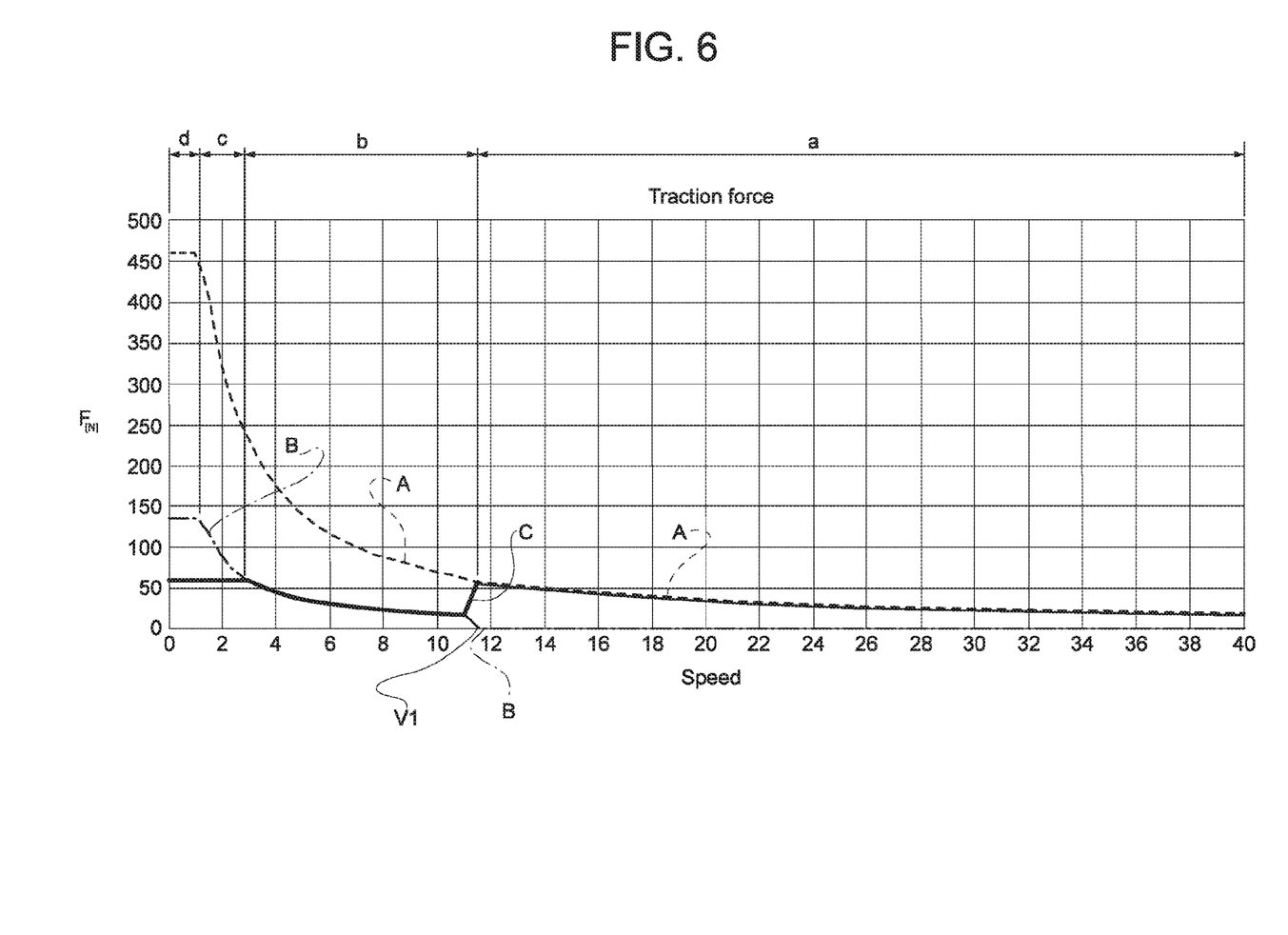
FIG. 6 illustrates the trend of the tractive force F of the motorized module of FIG. 3 as its advancement speed varies.

The graph of FIG. 6 illustrates, in the same four areas "a"-"d" mentioned above and, therefore, again as the advancement speed of the module 4 varies, the variation of the traction action F. In particular, the continuous line A represents the trend of the tractive force of the module 4, whereas the line B represents the variation of the tractive force of each axle 8, 9 and 10, and the line C represents the tractive force of the axle 11 again as the advancement speeds of the module 4 vary.

In particular it should be noted that the traction action of the axles 8, 9 and 10 annuls at the speed V1 and that, for speeds greater than V1 after the speed V1, the traction action is the only action transmitted by the axle 11.

The control logic graphically illustrated in FIG. 5, i.e., with simultaneous engagement of the reducers 8R, 9R and 10R, is to be preferred and finds advantageous application in case of low-grip conditions in order to reduce the probability of slippage of the wheels 12. In fact, as the advancement speeds of the module 4 decrease, when the angular joints 8G, 9G and 10G are activated, with the same overall tractive force, the lowest torque transmitted to wheels 12 is guaranteed, with obvious advantages from the point of view of possible slippage of the wheels 12.

However, it could be experimentally observed that for values lower than 20-25% of the maximum available displacement of the hydraulic motors 11A, adjustment of the displacement of the hydraulic motors 11A themselves is, however, disadvantageous in terms of efficiency. Therefore, adjustment of the displacement of the hydraulic motors 11A is carried out by keeping 30% of the maximum available displacement as the lower limit.

Figure 7:
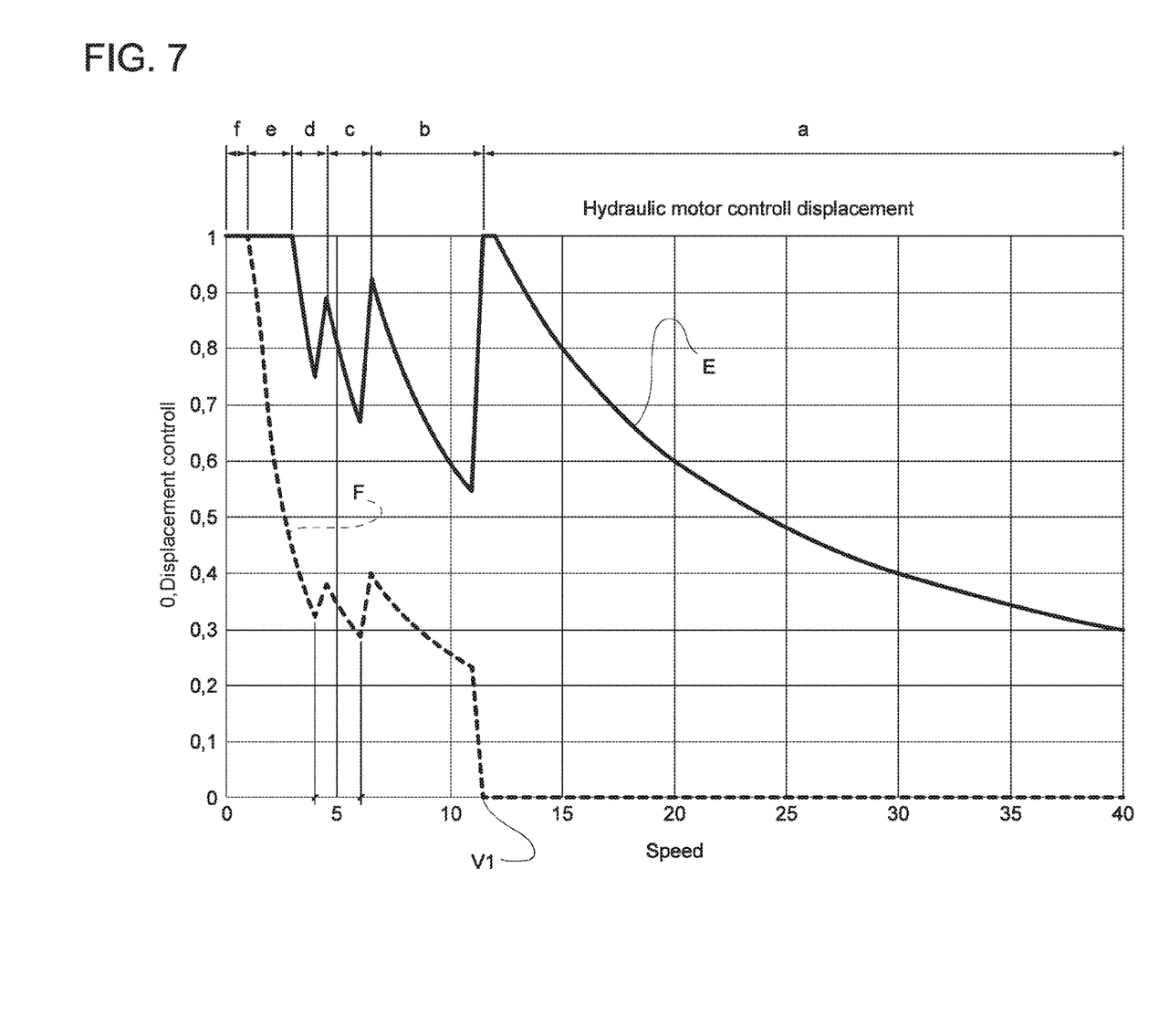
FIG. 7 is a figure similar to FIG. 5 and illustrates a different control mode of the motorized module of FIG. 3.

The graphs of FIG. 7 illustrate a control mode of the module 4 different from the one represented by the graphs of FIG. 5.

In particular, the graphs of FIG. 7 illustrate a control condition of the module 4, in which the angular joints 8G, 9G and 10G are engaged in succession as the advancement speed decreases. In this manner, it is possible to increase the percentage for adjusting the displacement of the hydraulic motors, due to the fact that the number of the hydraulic motors themselves connected to the wheels is lower. In other words, said control mode allows to initially distribute the maximum overall towing force over a smaller number of axles with respect to the condition of simultaneous engagement of all the angular joints 8G, 9G and 10G.

In said control mode, the area "b" of simultaneous adjustment of the displacement of hydraulic motors is reduced, leaving space for an area "e" where the displacement of the hydraulic motors 11A is the maximum and the displacements of the hydraulic motors 8A, 9A and 10A are adjusted, and an area "f" where all the hydraulic motors 8A, 9A, 10A and 11A operate at their maximum displacement.

As for the control mode that provides for the simultaneous insertion of all the angular joints 8G, 9G and 10G, also in the insertion mode in succession, in the area "a" the advancement of the module is managed only with the adjustment of the hydraulic motor 11A.

Figure 8:
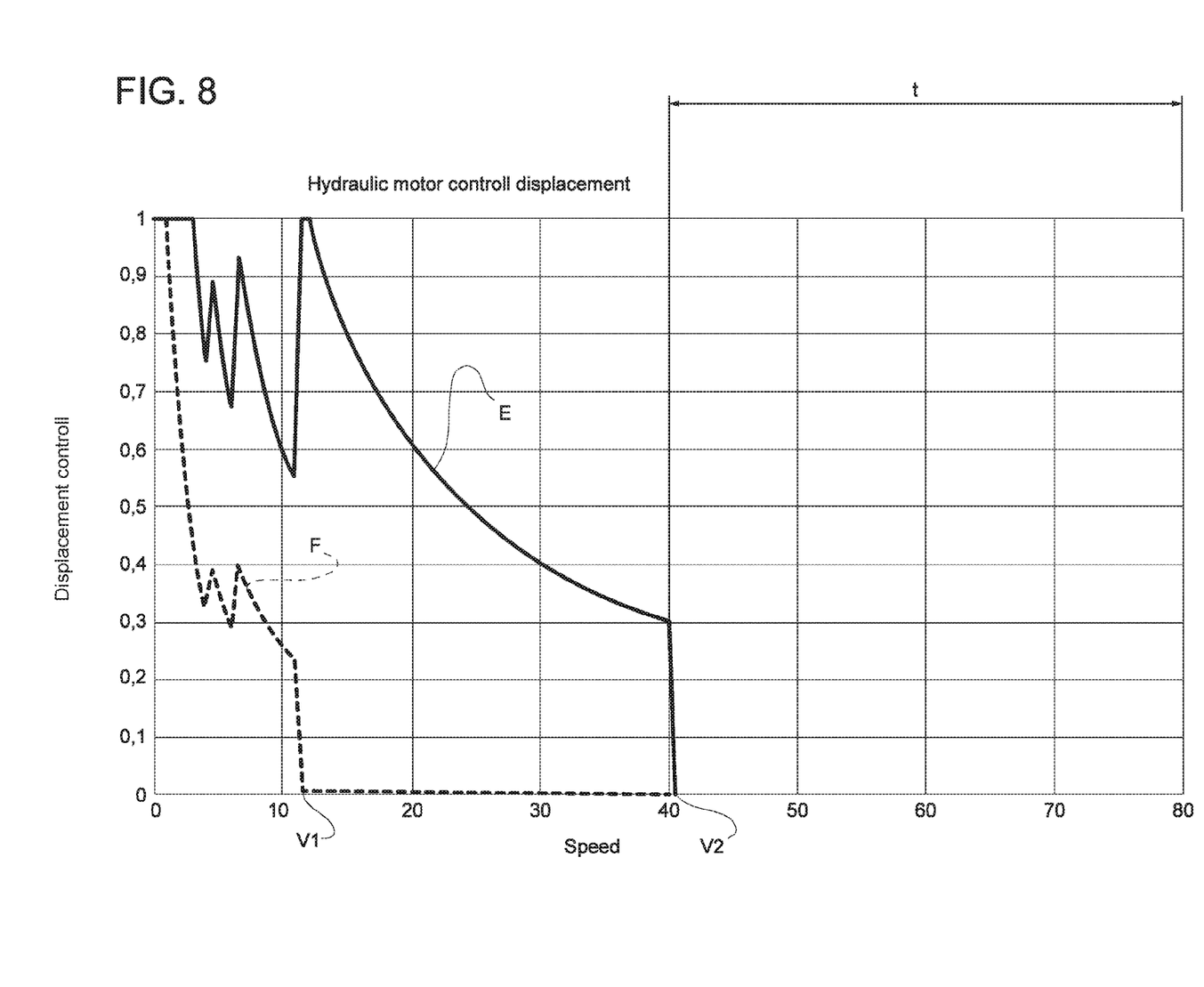
FIG. 8 is a figure similar to FIG. 7 and illustrates a further control mode of the motorized module of FIG. 3.

In both adjustment modes described above, at the moment in which the advancement speed of the module 4 exceeds an operating limit speed of the reducers 11G, designated by V2, the angular joint 11G is also released making the respective pair of wheels 12 idle and the hydraulic motors 11A are brought to their minimum displacement, as can be seen from the graph of FIG. 8, area "t".

In this condition, the module 4 behaves in the same way as an ordinary trailer with idle wheels so that it remains stationary if operating autonomously, or is dragged when connected to the tractor 2.

In use, starting from the condition illustrated in the graph of FIG. 8, in which all the angular joints 8G, 9G, 10G and 11G are released and the module 4 is dragged only by the tractor 2 at a cruising speed, for example 80 km/h, at the moment in which, for various reasons, the advancement speed begins to decrease, the tractor 2 alone increases the pulling action until the speed V2 is reached. At said speed, the unit 20 activates the angular joint 11G and adjusts the hydraulic motors 11A thereby integrating the traction action. If, despite the action of the hydraulic motors 11A, the speed continues to reduce, at the moment the speed V1 is reached, depending on the transport conditions, one or the other of the control modes described above may be selected. In particular, the control mode can be carried out with simultaneous insertion of the angular joints 8G, 9G and 10G illustrated in FIG. 5 in a low-grip condition so as to guarantee the lowest torque transmitted to the corresponding wheels 12.

Alternatively, the angular joints 8G, 9G and 10G can be activated in succession, as illustrated in FIG. 7. Said mode allows to increase the percentage for adjusting the displacement of the motors 8A, 9A and 10A, as the number of hydraulic motors involved progressively increases. In other words, said mode allows the maximum overall towing force to be initially distributed over a smaller number of axles compared to the condition of simultaneous insertion.

From the above it is clear that, compared to the known solutions, the module 4 and its various adjustment or setting possibilities allow for use both on special transport vehicles, which require very different speed performances between travelling conditions with no load and with a load, and on modular on-road vehicles, which in traditional conditions of use can be used as simple trailers or semi-trailers.

In addition to this, the module 4 can be used as an autonomous self-propelled unit, but is capable of allowing movements in a much higher speed range than a traditional self-propelled unit, precisely due to the fact of having mechanical reducers with a different reduction ratio present on a same module 4 and in combination, or not, with hydraulic motors with a different displacement.

In particular, the module 4 finds advantageous application in so-called "monolithic" vehicles or machines. In this case, high speed movements are possible, for example in the absence of a load, by releasing the reducers 8R, 9R, and 10R so as to make the wheels 12 of the axles 8, 9, and 10 idle, and by using only the axle 11 as the sole towing axle.

Movements in a load condition are, instead, possible by making all four axles 8, 9, 10 and 11 pulling axles.

The position of each of the angular joints 8G, 9G, 10G and 11G between the respective reducer 8R, 9R, 10R and 11R and the respective wheels 12 allows there to be no moving gears when dragged by the respective wheels 12. In other words, the position of the angular joints allows the module to be towed up to a maximum speed equal to the traditional modules, without encountering resistance generated by the reducers.

In addition to this, the module 4 allows the towing tractor 2 to be supported during any step of use for the speed range defined in the design stage, generally variable between 40 and 50 km/h to maintain the cruising speed up to the permissible design limit, when the quantity of the load would not allow it, effectively replacing a second towing tractor.

Again, the module 4 supports the tractor 2 both when tackling uphill climbs, where the necessary towing force exceeds the available performance, and when moving in low-grip conditions.

In absence of the tractor 2, the module 4 is able to move the load autonomously, for example in structures, where movement is known to occur at low speed.

The assembly of motorized axles with a different reduction ratio and with hydraulic motors with a different displacement on a same module allows an expansion of the conditions of use of the module 4 or of the vehicle 1.

From the foregoing it is firstly clear that several modules 4 with the same or different characteristics can be used in the vehicle 1 to increase the traction action and, respectively, to increase the range of application or modify the thrust or adjustment action in specific ranges of advancement speed.

Furthermore, the module 4 described could comprise a different number of axles with reducers having the same reduction ratio or a larger number of axles with a smaller reduction ratio than the other axles. Not only that, but the axles could be driven by hydraulic motors having the same displacement or with different displacements from those indicated by way of example, also mechanical reducers with a discretely variable reduction ratio could be replaced or alongside the mechanical reducers described. Lastly, the axles 8, 9, 10 and 11 could comprise a different number of wheels 12 or a same hydraulic motor could drive both the wheels of a same axle by using specific transmissions, known per se.

The invention claimed is:

1. A motorized module for goods transport comprising a loading platform; at least a first and at least a second axle each provided with at least one respective rolling body on the ground; and actuation means for actuating said rolling bodies; said actuation means comprising a closed circuit hydraulic system, in turn comprising a closed hydraulic circuit, at least one motorized pump arranged along the closed circuit to send a pressurized operating fluid to a delivery branch and receive the pressurized fluid from a return branch of the closed circuit, at least a first and at least a second variable displacement hydraulic motor both hydraulically connected to the delivery branch and to the return branch to operate the rolling body of the first axle and the rolling body of said second axle, respectively; said actuation means further comprising a first mechanical reducer interposed between the first hydraulic motor and the respective rolling body, a second mechanical reducer interposed between said second hydraulic motor and the respective rolling body, first and second releasable angular connection means interposed between said first hydraulic motor and the respective said rolling body and, between the second hydraulic motor and the respective rolling body, respectively, and an electronic command and control unit comprising means for acquiring the advancement speed of the module, means for controlling said hydraulic motors and means for activating/deactivating said first and second releasable angular connection means; said command and control unit being configured to vary the displacement of said first and second hydraulic motors and to control said first and second releasable angular connection means as a function of said advancement speed of the unit; wherein said first mechanical reducer has a reduction ratio less than the reduction ratio of said second mechanical reducer and in that said command and control unit is configured to activate said first angular connection means and subsequently said second angular connection means as said advancement speed of said module decreases.

2. The module according to claim 1, wherein said command and control unit is configured to activate only said first releasable angular connection means when the advancement speed of the module is less than a first operating limit speed of the first reducer.

3. The module according to claim 2, wherein said command and control unit is configured to keep said first angular connection means active and to also activate said second angular connection means when the advancement speed of the module is less than a second operating limit speed less than said first operating limit speed.

4. The module according to claim 3, wherein said second speed is the operating limit speed of the second reducer.

5. The module according to claim 1, wherein said first and second releasable angular connection means are interposed between the first mechanical reducer and the respective rolling body and between the second mechanical reducer and the respective rolling body, respectively.

6. The module according to claim 1, wherein said first hydraulic motor has a maximum displacement greater than the maximum displacement of said second hydraulic motor.

7. The module according to claim 1, wherein said first and second angular connection means each comprise a respective clutch or means for engaging/disengaging the rotary motion.

8. The module according to claim 1, wherein at least one of said mechanical reducers is a reducer with a fixed reduction ratio.

9. The module according to claim 1, wherein it comprises two or more second axles; each second axle comprising a respective said second mechanical reducer and respective second angular connection means; said command and control unit being configured to activate or deactivate the second angular connection means of one of said second axles independently of the second angular connection means of the other second axles.

10. The module according to claim 9, wherein said command and control unit is configured to activate or deactivate in succession said second angular connection means as said advancement speed varies.

11. A method for controlling a motorized module for goods transport as claimed in claim 1, the method comprising the steps of determining an advancement speed of the module, deactivating said first and second angular connection means when the determined advancement speed is greater than a first operating limit speed of the first reducer, activating said first connection means when the advancement speed of the module is less than said first operating limit speed and activating also said second angular connection means when the advancement speed of the module is less than a second operating limit speed of the second mechanical reducer less than said first operating limit speed.

12. The method according to claim 11, wherein the module comprises two or more of said second axles; each second axle comprising a respective said second mechanical reducer and respective second angular connection means; wherein by activating or deactivating the second angular connection means of one of said second axles independently from the activation or deactivation of the second angular connection means of the other second axles and as said advancement speed varies.

13. The method according to claim 12, wherein said second angular connection means of said second axles are activated or deactivated simultaneously while keeping said first angular connection means activated.

14. The method according to claim 12, wherein by activating or deactivating in succession said second angular connection means for speeds less than said second operating limit speed.

* * * * *